US012497178B1

(12) United States Patent
Fasola

(10) Patent No.: US 12,497,178 B1
(45) Date of Patent: Dec. 16, 2025

(54) FIRE RESCUE LADDER

(71) Applicant: Government of the United States, as represented by the Secretary of the Air Force, Wright-Patterson AFB, OH (US)

(72) Inventor: Nicholas Fasola, Ewa Beach, HI (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 1072 days.

(21) Appl. No.: 17/523,021

(22) Filed: Nov. 10, 2021

Related U.S. Application Data

(60) Provisional application No. 63/119,785, filed on Dec. 1, 2020.

(51) Int. Cl.
*B64D 25/08* (2006.01)
*A62B 1/20* (2006.01)
*E06C 1/12* (2006.01)
*E06C 1/38* (2006.01)

(52) U.S. Cl.
CPC ................ *B64D 25/08* (2013.01); *A62B 1/20* (2013.01); *E06C 1/125* (2013.01); *E06C 1/38* (2013.01)

(58) Field of Classification Search
CPC ........ B64D 25/14; B64D 25/00; B64D 25/08; A62B 1/20; A62B 1/02; A62B 1/00; E06C 1/125; E06C 1/38
USPC ............................................................ 182/49
See application file for complete search history.

(56) References Cited

U.S. PATENT DOCUMENTS

| | | | | | |
|---|---|---|---|---|---|
| 150,394 | A | * | 5/1874 | Carnes | E06C 1/32 182/208 |
| 296,419 | A | * | 4/1884 | Magnus | E06C 1/32 182/104 |
| 431,878 | A | * | 7/1890 | Davis | E06C 1/12 182/209 |
| 444,607 | A | * | 1/1891 | Eder | A62C 31/24 182/180.1 |
| 701,483 | A | * | 6/1902 | Hemming | E06C 9/085 182/51 |
| 1,466,757 | A | * | 9/1923 | Riemer | E06C 1/38 182/116 |
| 1,640,702 | A | * | 8/1927 | Hodgson | E06C 9/02 182/77 |
| 1,942,210 | A | * | 1/1934 | Harting | E06C 1/39 182/27 |
| 2,024,039 | A | * | 12/1935 | Harting | E06C 1/32 182/27 |
| 2,175,748 | A | * | 10/1939 | Dunn | A62B 1/02 280/18 |
| 2,311,070 | A | * | 2/1943 | Morando | A62B 1/02 182/103 |

(Continued)

*Primary Examiner* — Nkeisha Smith
(74) *Attorney, Agent, or Firm* — AFMCLO/JAZ; Matthew D. Fair

(57) ABSTRACT

A rescue ladder includes a first ladder portion having a plurality of cross members forming steps, a second ladder portion having a plurality of cross members forming steps, and a central portion connected between the first ladder portion and the second ladder portion. A slide is coupled to the central portion of the ladder. The rescue ladder is configured to permit a rescuer to straddle the slide while helping the pilot or passenger egress from the aircraft via the slide.

19 Claims, 2 Drawing Sheets

(56) References Cited

U.S. PATENT DOCUMENTS

| | | | | | |
|---|---|---|---|---|---|
| 2,946,396 | A * | 7/1960 | Mcdougal | A62B 5/00 | 182/206 |
| 3,115,211 | A * | 12/1963 | Ostrander, Jr. | E06C 7/12 | 187/241 |
| 3,295,269 | A * | 1/1967 | Schuster | A45B 19/00 | 52/646 |
| 4,102,433 | A * | 7/1978 | Van Valkenburgh | E06C 1/345 | 182/164 |
| 4,317,504 | A * | 3/1982 | Artaud | E06C 5/04 | 182/66.2 |
| 4,533,017 | A * | 8/1985 | Litchfield | A62B 5/00 | 182/3 |
| 4,813,663 | A * | 3/1989 | Rice | A63G 21/02 | 182/48 |
| 4,917,216 | A * | 4/1990 | Kimber | E06C 1/10 | 182/151 |
| 4,930,599 | A * | 6/1990 | Simms, Sr. | B66B 9/16 | 187/241 |
| 5,189,746 | A * | 3/1993 | Horie | A61G 1/01 | 5/628 |
| 5,253,885 | A * | 10/1993 | McCracken | A61G 1/007 | 280/5.2 |
| 5,853,281 | A * | 12/1998 | Farmer | B65G 39/07 | 296/61 |
| 6,053,278 | A * | 4/2000 | Myers | A01M 31/02 | 182/20 |
| 6,073,287 | A * | 6/2000 | Svensson | B63C 9/04 | 441/83 |
| 6,945,360 | B2 * | 9/2005 | Sullivan, Jr. | E06C 1/10 | 182/151 |
| 7,370,725 | B1 * | 5/2008 | Dornfeld | E06C 7/12 | 182/39 |
| 7,424,932 | B1 * | 9/2008 | Murphy | E06C 1/345 | 182/103 |
| 7,614,103 | B2 * | 11/2009 | Beaudry | A61G 1/013 | 5/81.1 R |
| 8,448,748 | B2 * | 5/2013 | Allred, III | E06C 7/087 | 182/115 |
| 8,464,833 | B2 * | 6/2013 | Lee | E06C 1/345 | 182/8 |
| 8,771,093 | B2 * | 7/2014 | Bowen | A63G 21/02 | 472/116 |
| 8,821,102 | B1 * | 9/2014 | Boguslawski | B60P 1/43 | 14/71.1 |
| 8,944,212 | B2 * | 2/2015 | Vaidyaselvan | E06C 1/393 | 182/115 |
| 9,488,003 | B2 | 11/2016 | Lampe et al. | | |
| 9,498,729 | B2 * | 11/2016 | Bowen | A63G 21/02 | |
| 9,630,116 | B1 * | 4/2017 | Chin | A63G 21/00 | |
| 10,112,063 | B1 * | 10/2018 | White | G08B 25/12 | |
| 10,240,392 | B2 * | 3/2019 | Roddenby | E06C 7/08 | |
| 11,186,377 | B2 * | 11/2021 | McFarland | B64D 25/14 | |
| 11,338,718 | B2 * | 5/2022 | Delanghe | B65G 69/30 | |
| 2005/0092548 | A1 * | 5/2005 | Sullivan | E04G 1/28 | 182/151 |
| 2010/0163340 | A1 * | 7/2010 | Allred, III | E06C 1/28 | 403/205 |
| 2011/0209947 | A1 * | 9/2011 | Allred, III | E06C 7/46 | 182/194 |
| 2016/0017657 | A1 * | 1/2016 | Wilson | E06C 7/188 | 29/434 |
| 2016/0032649 | A1 * | 2/2016 | Moreau | E06C 5/04 | 182/69.4 |
| 2016/0081864 | A1 * | 3/2016 | Bradbury | A61G 1/007 | 187/241 |
| 2018/0256421 | A1 * | 9/2018 | Ishikawa | A61G 3/061 | |
| 2021/0162908 | A1 * | 6/2021 | Drummond | B65G 69/287 | |
| 2023/0091793 | A1 * | 3/2023 | Shivappa | B64D 25/14 | 244/137.2 |

* cited by examiner

FIRE RESCUE LADDER

Pursuant to 37 C.F.R. § 1.78 (a) (4), this application claims the benefit of and priority to prior filed Provisional Application Ser. No. 63/119,785, filed on Dec. 1, 2020, which is expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to a rescue ladder and more particularly to a rescue ladder used to extract pilots, crew and/or passengers from an aircraft.

BACKGROUND

Various apparatus have been used to facilitate egress from an aircraft during an emergency such as an onboard fire or the like. These apparatuses can include ladders, moveable stairs, or inflatable slides. Fighter aircraft in particular have limitations as they do not have space on board to carry such apparatus. Therefore, a rescue vehicle such as a firetruck or the like must provide such apparatus during emergencies. Existing rescue ladders have various shortcomings relative to certain applications. Accordingly, there remains a need for further contributions in this area of technology.

SUMMARY

One embodiment of the present disclosure includes a unique fire rescue ladder for an aircraft. Other embodiments include apparatuses, systems, devices, hardware, methods, and combinations wherein a rescue ladder includes a slide positioned between a pair of ladders on either side thereof. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
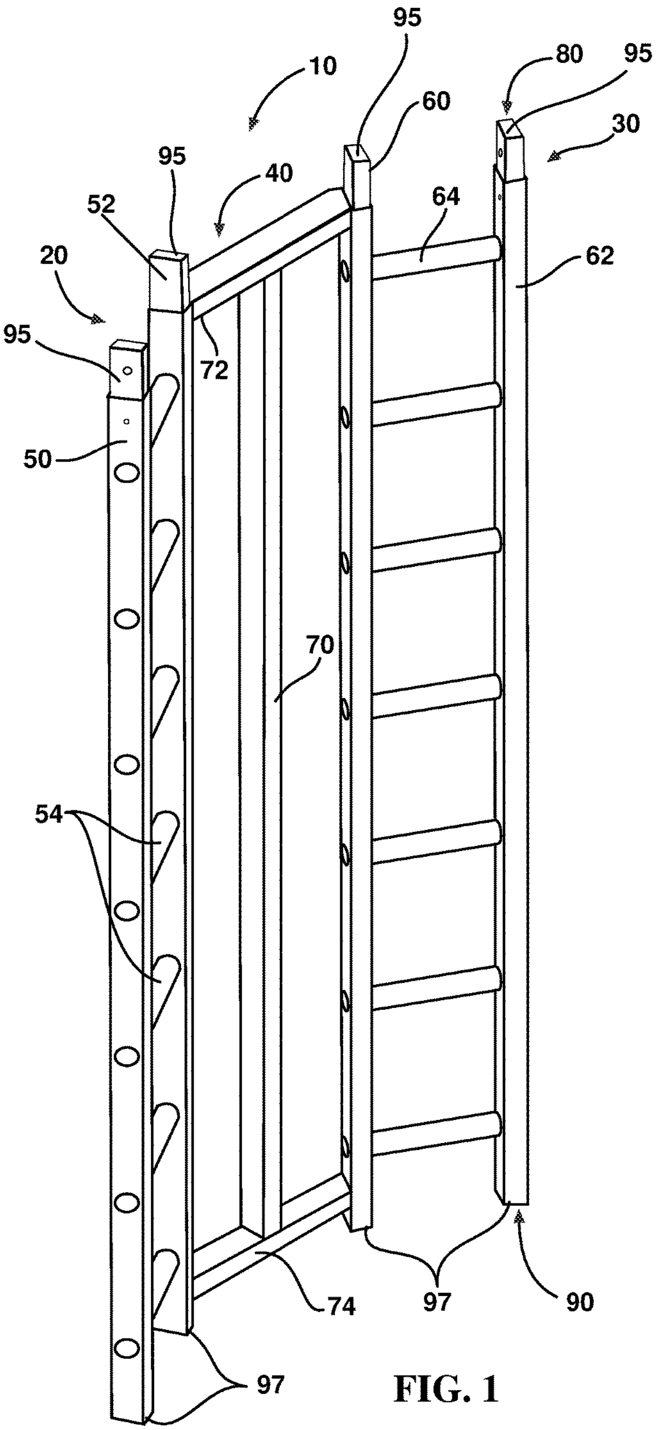
FIG. 1 is a perspective view of a fire rescue ladder according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
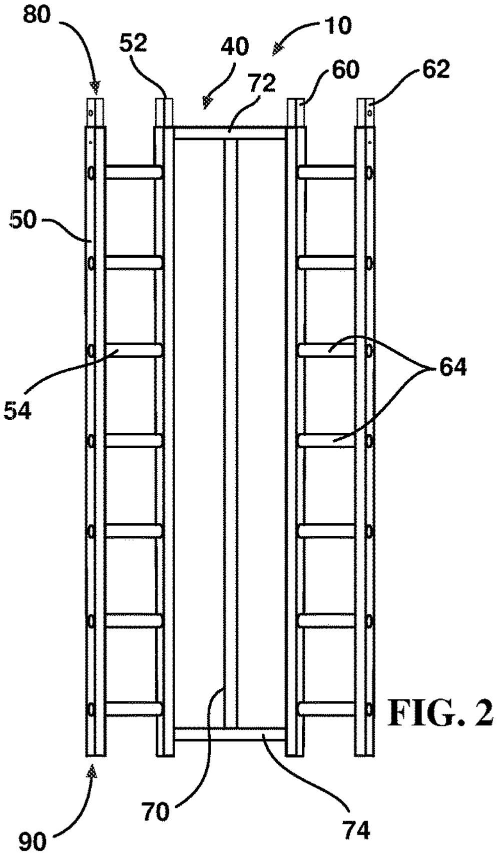
FIG. 2 is another perspective view of the fire rescue ladder of FIG. 1.
Figure 3:
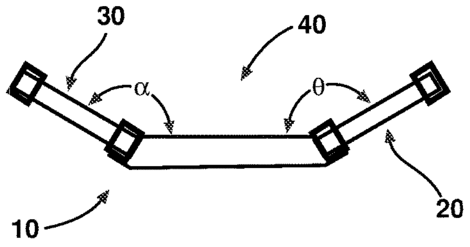
FIG. 3 is top view of the fire rescue ladder of FIG. 1.

Referring generally to FIGS. 1-3, various views of a rescue ladder 10 according to one embodiment of the present disclosure is depicted. As an initial matter it should be understood that directional annotations such as top, bottom, left, right, central, above, below or other similar descriptors are relative to the view shown in the drawings and do not define the rescue ladder 10 in absolute terms.

The rescue ladder 10 includes a first ladder portion 20 on the left side, a second ladder portion 30 on the right side and a central portion 40 positioned between the first and second ladder portions 20, 30, respectively. The first ladder portion 20 includes a first rail 50 spaced apart from a second rail 52. A plurality of first cross members 54 extend between the first and second rails 50, 52 to form steps for a rescuer to climb. The second ladder portion 30 includes a third rail 60 spaced apart from a fourth rail 62. A plurality of second cross members 64 extend between the third and fourth rails 60, 62 to form steps for a rescuer to climb.

The central portion 40 can include a central rail 70 extending between a top cross member 72 and a bottom cross member 74. In some forms, the central portion 40 can include a plurality of central rails 70. The top and bottom cross members 72, 74 are connected to the second rail 52 and the third rail 60 at either end thereof. In alternate embodiments, the central portion 40 may include additional central rails and additional cross members between the second rail 52 and the third rail 62.

The rescue ladder 10 can include a connecting end 80 and a receiving end 90. The connecting and receiving ends 80, 90 are configured to lockingly engage with another rescue ladder 10 such that segments are stackable to increase an overall length of the rescue ladder 10 for aircraft requiring greater ladder lengths. The connecting end 80 may include a tongue 95 extending from each of the rails 50, 52, 60 and 62. The receiving end 90 includes a receiving groove 97 shaped and sized to receive a tongue 95 from another ladder segment. In some forms a locking feature (not shown) such as a fastener, clamp or the like may be used to prevent inadvertent separation of the ladder segments.

Referring more specifically to FIG. 3, a top view of the rescue ladder 10 is illustrated. The first and second ladder portions 20, 30 can extend from the central portion 40 at angles θ and a respectively. In one form the angles θ, a may be the same and can range between 90° and 180°. In other forms the angles θ, a may be different from one another depending on the application or particular aircraft being serviced.

Figure 4:
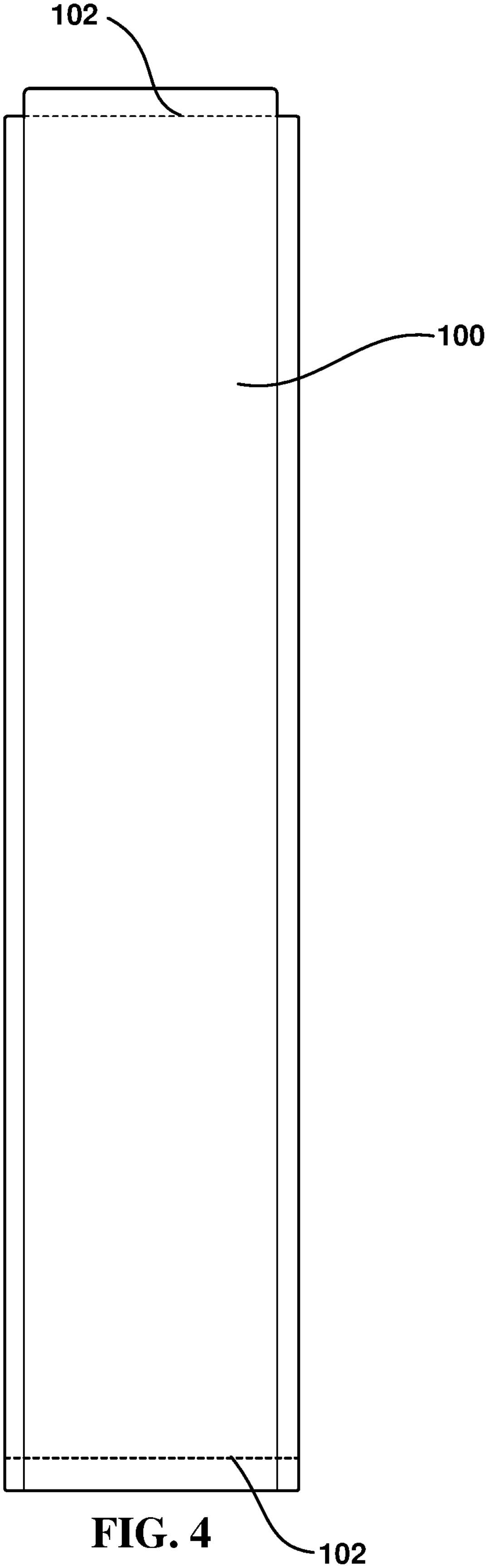
FIG. 4 is plan view of a slide for the fire rescue ladder of FIG. 1.
Figure 5:
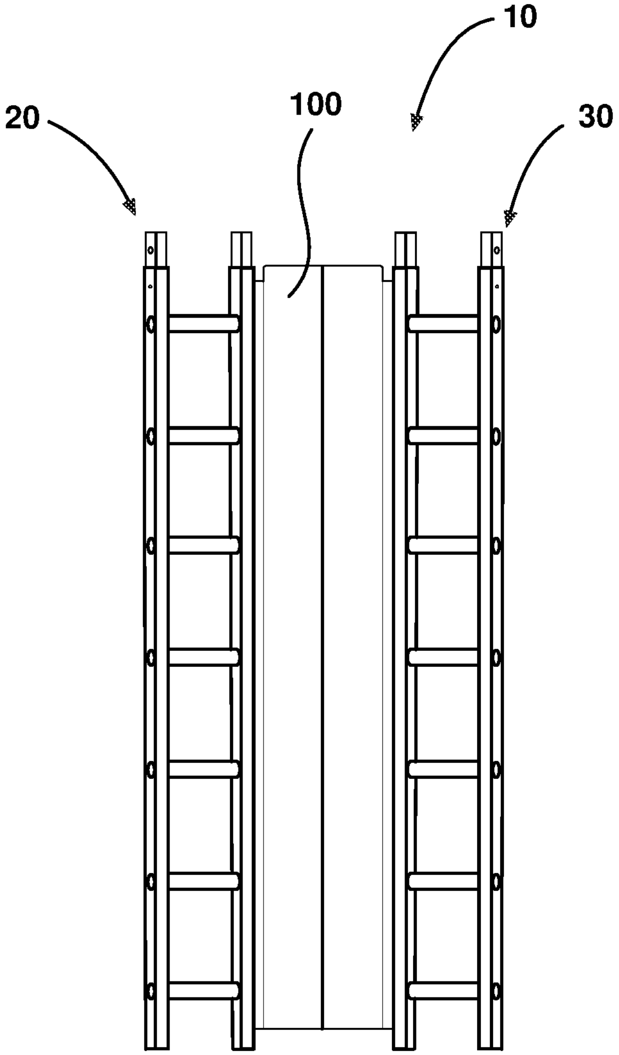
FIG. 5 is a perspective view of fire rescue ladder with the slide connected thereto.

A slide member 100 shown in FIG. 4 can be connected to the central portion 40 of the rescue ladder 10. In some forms, the slide member 100 can be permanently attached via welding, brazing or other bonding means as illustrated at the dashed lines 102 proximate the top cross member 72 and the bottom cross member 74 of the central portion 40. In other forms, the slide member 100 can be connected via mechanical attachment such as with threaded fasteners, hooks, clamps or other means known to one skilled in the art. FIG. 5 shows a perspective view of the rescue ladder 10 with the slide member 100 connected thereto. The rescue ladder 10 may be formed from one or more of a plurality of materials. The material(s) may include, but are not limited to, metals, metal alloys, composites, plastics and ceramics.

In operation, a rescue ladder 10 may be used to rescue a pilot and/or aircraft passengers that are disabled or otherwise lack the ability to escape from the aircraft on their own. In some forms, the ladder may be brought to the aircraft and the pilot may be able side down the ladder 10 without any further assistance. In other forms the ladder 10 may permit two rescuers such as fire fighters or paramedics to climb the ladder on either side (first and second ladder portions) and assist a passenger onto the slide 100 and help with egress from the aircraft. In yet other forms the ladder 10 may be configured to permit one rescuer to straddle the slide 100 and use the both the first and second portions 20, 30 of the ladder 10 to climb up to the passenger. The rescuer can then hold onto and help slide the passenger down the slide member 100 while straddling the passenger and climbing down the first and second portions 20, 30 of the ladder 10.

In one aspect the present application includes a rescue ladder comprising: a first ladder portion having a plurality of cross members intermittently positioned along a length thereof; a second ladder portion having a plurality of cross members intermittently positioned along a length thereof; a central portion connected between the first ladder portion and the second ladder portion; and a slide member coupled to the central portion.

In refining aspects the first ladder portion extends at a first obtuse angle from the central portion; the second ladder portion extends at a second obtuse angle from the central portion; the first and second obtuse angles are different from one another; wherein the first and second obtuse angles are the same; wherein the central portion includes a central rail extending from a bottom cross member to a top cross member; wherein the bottom cross member and the top cross member are connected to the first ladder portion and to the second ladder portion; wherein the slide member engages with the central rail; wherein the first ladder portion, second ladder portion and central portion form a ladder section that includes a connecting end and a receiving end on opposing ends thereof; wherein the connecting end of one ladder section is connected to a receiving end of another ladder section to extend a length thereof; and wherein a width of the slide is sized to permit a rescuer to straddle and simultaneously step on the first ladder portion and the second ladder portion during a rescue extraction.

In another aspect, an aircraft rescue ladder comprises: a first rail and a second rail spaced apart and connected together with a plurality of first cross members; a third rail and a fourth rail spaced apart and connected together with a plurality of second cross members; a central rail extending between a central top cross member and a central bottom cross member, wherein the central top cross member and the central bottom cross member are connected to the second rail and to the third rail; and a slide engaged with the central rail and extending between the second and third rails.

In refining aspects of the aircraft rescue ladder the first and second cross members extend at an angle away from the top and bottom cross members; wherein the angle of the first cross members is different from the angle of the second cross members; wherein the angle of the first cross members is the same as the same angle of the second cross members; wherein each of the first, second, third and fourth rails form a ladder segment with a connecting end opposite of a receiving end; wherein a connecting end of one ladder segment is connected to a receiving end of another ladder segment to increase an overall length thereof; and wherein a width of the slide is sized to permit a rescuer to straddle and simultaneously step on one of the first cross members and one of the second cross members while sliding an aircraft occupant on the slide.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A rescue ladder comprising:

a first ladder portion having a plurality of cross members intermittently positioned along a length thereof;

a second ladder portion having a plurality of cross members intermittently positioned along a length thereof;

a central portion connected between the first ladder portion and the second ladder portion;

wherein the central portion includes a central rail positioned between the first ladder portion and the second ladder portion that extends from a bottom cross member to a top cross member; and a slide member coupled to the central portion.

2. The rescue ladder of claim 1, wherein the first ladder portion extends at a first obtuse angle from the central portion.

3. The rescue ladder of claim 2, wherein the second ladder portion extends at a second obtuse angle from the central portion.

4. The rescue ladder of claim 3, wherein the first and second obtuse angles are different from one another.

5. The rescue ladder of claim 3, wherein the first and second obtuse angles are the same.

6. The rescue ladder of claim 1, wherein the bottom cross member and the top cross member are connected to the first ladder portion and to the second ladder portion.

7. The rescue ladder of claim 1, wherein the slide member engages with the central rail.

8. The rescue ladder of claim 1, wherein the first ladder portion, second ladder portion and central portion form a ladder section that includes a connecting end and a receiving end on opposing ends thereof.

9. The rescue ladder of claim 8, wherein the connecting end of one ladder section is connected to a receiving end of another ladder section to extend a length thereof.

10. The rescue ladder of claim 1, wherein a width of the slide is sized to permit a rescuer to straddle and simultaneously step on the first ladder portion and the second ladder portion during a rescue extraction.

11. An aircraft rescue ladder comprising:

a first rail and a second rail spaced apart and connected together with a plurality of first cross members;

a third rail and a fourth rail spaced apart and connected together with a plurality of second cross members;

a central rail positioned between the second rail and the third rail and extended between a central top cross member and a central bottom cross member;

wherein the central top cross member and the central bottom cross member are connected to the second rail and to the third rail; and a slide engaged with the central rail and extending between the second and third rails.

12. The aircraft rescue ladder of claim 11, wherein the first and second cross members extend at an angle away from the top and bottom cross members.

13. The aircraft rescue ladder of claim 12, wherein the angle of the first cross members is different from the angle of the second cross members.

14. The aircraft rescue ladder of claim 12, wherein the angle of the first cross members is the same as the same angle of the second cross members.

15. The aircraft rescue ladder of claim 12, wherein each of the first, second, third and fourth rails form a ladder segment with a connecting end opposite of a receiving end.

16. The aircraft rescue ladder of claim 15, wherein a connecting end of one ladder segment is connected to a receiving end of another ladder segment to increase an overall length thereof.

17. The aircraft rescue ladder of claim 11, wherein a width of the slide is sized to permit a rescuer to straddle and simultaneously step on one of the first cross members and one of the second cross members while sliding an aircraft occupant on the slide.

18. A rescue ladder comprising:

a first ladder portion having a plurality of cross members intermittently positioned along a length thereof;

a second ladder portion having a plurality of cross members intermittently positioned along a length thereof;

a central portion connected between the first ladder portion and the second ladder portion;

wherein the first ladder portion, second ladder portion and central portion form a ladder section that includes a connecting end and a receiving end on opposing ends thereof; and a slide member coupled to the central portion.

19. The rescue ladder of claim 18, wherein the connecting end of one ladder section is connected to a receiving end of another ladder section to extend a length thereof.

* * * * *